(12) United States Patent
Lin

(10) Patent No.: US 7,438,811 B2
(45) Date of Patent: Oct. 21, 2008

(54) WATER PURIFICATION APPARATUS

(76) Inventor: Yi-Chou Lin, No. 20, Alley 84, Lane 350, Siaoyi Rd., Hemei Town, Changhua County (TW) 508

( * ) Notice: Subject to any disclaimer, the term of this patent is extended or adjusted under 35 U.S.C. 154(b) by 0 days.

(21) Appl. No.: 11/832,060

(22) Filed: Aug. 1, 2007

(65) Prior Publication Data
US 2008/0029452 A1    Feb. 7, 2008

(30) Foreign Application Priority Data
Aug. 4, 2006    (TW) .............................. 95213772 U

(51) Int. Cl.
*B01D 27/08* (2006.01)
*B01D 35/30* (2006.01)
(52) U.S. Cl. ................... 210/232; 210/323.2; 210/335; 210/444
(58) Field of Classification Search ................. 210/232, 210/444, 323.2, 335
See application file for complete search history.

(56) References Cited

U.S. PATENT DOCUMENTS

| 3,319,791 | A | * | 5/1967 | Horne ......................... 210/234 |
| 4,252,650 | A | * | 2/1981 | Mas et al. ..................... 210/86 |
| 5,083,442 | A | * | 1/1992 | Vlock .......................... 62/338 |
| 5,112,477 | A | * | 5/1992 | Hamlin ......................... 210/85 |
| 6,800,199 | B1 | * | 10/2004 | Rhee ........................... 210/232 |
| 2003/0168394 | A1 | * | 9/2003 | Gill ............................ 210/249 |
| 2006/0000761 | A1 |   | 1/2006 | Choi et al. |

FOREIGN PATENT DOCUMENTS

| KR | 99086940 | * | 12/1999 |
| KR | 2001103506 | * | 11/2001 |
| WO | 01/83079 | * | 11/2001 |
| WO | 2004/041409 | * | 5/2004 |

\* cited by examiner

*Primary Examiner*—Thomas M Lithgow
(74) *Attorney, Agent, or Firm*—Pai Patent & Trademark Law Firm; Chao-Chang David Pai

(57) ABSTRACT

A water purification apparatus includes a main body having an accommodation chamber inside and a plate on a top side thereof, a lid pivotally mounted on the main body and closable on the main body, a holder mounted with the plate of main body and defining with the plate of the main body a distance, a top cover pivotally mounted with the holder and having a retaining portion, an inlet and an outlet opposite to the inlet, and a housing having a jamming portion detachably engageable with the retaining portion of the top cover, a first water filler hole in communication with the inlet of the top cover and a second water filler hole in communication with the outlet of the top cover. The water purification apparatus has the advantages of being convenient to exchange a filter.

3 Claims, 8 Drawing Sheets

WATER PURIFICATION APPARATUS

BACKGROUND OF THE INVENTION

1. Field of the Invention

The present invention relates to a water purification apparatus and more specifically, to a water purification apparatus, which is convenient in filter exchange work and reduce the space.

2. Description of the Related Art

In general, a water purification apparatus may include a filter for filtering or purified water, thereby removing some of its impurities. When the water purification apparatus has been used for a while, the filter will gradually lower its filtration ability due to the accumulation of impurities, resulting in that the filter has to be exchanged.

U.S Pat. No. 2006/0000761 discloses a one-touch fitting type adapter and a filter assembly. When the filter assembly is assembled with the adapter, a collar flange of the filter assembly will move upward along slide plates of the adapter while horizontally moving the slide plates of the adapter in left and right directions. When the collar flange of the filter assembly moves upward beyond the slide plates of the adapter, the slide plates of the adapter may return to their initial position so that the filter assembly is engaged with the adapter.

In machinery equipped with a plurality of the filter assemblies, such as water purifiers or water ionizers, the machinery will provide a plurality of the one-touch fitting adapters aligned parallel to each other for coupling the filter assemblies. When the life span of the filter assemblies expires, the filter assemblies have to be selectively exchanged.

However, the filter assembly and the adapter cause a complex coupling or decoupling way, resulting in a difficulty in filter exchange work. In addition, the interior space of the machinery is limited and the filter assembly cannot be pivoted to the outside of the machinery during the filter exchange work, causing users to be difficult to exchange the filter assembly. Thus, it is a need to provide an improved filter assembly that does not have the aforesaid drawbacks.

SUMMARY OF THE INVENTION

The present invention has been accomplished in view of the above-noted circumstances. It is therefore one objective of the present invention to provide a water purification apparatus, which is convenient to exchange a filter.

To achieve this objective of the present invention, the water purification apparatus comprises a main body, a holder, a top cover, a housing, and a lid. The main body has an accommodation chamber inside and a plate on a top side thereof. The lid is pivotally mounted on a front side of the main body and closable on a front side of the main body. The holder is mounted with a main body of a water purification apparatus and defines with the main body of the water purification apparatus a distance. The top cover is pivotally mounted with the holder and provided with a retaining portion, an inlet thereof and an outlet thereof opposite to the inlet. The housing has a jamming portion detachably engageable with the retaining portion of the top cover, a first water filler hole in communication with the inlet of the top cover and a second water filler hole in communication with the outlet of the top cover.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE INVENTION

Figure 1:
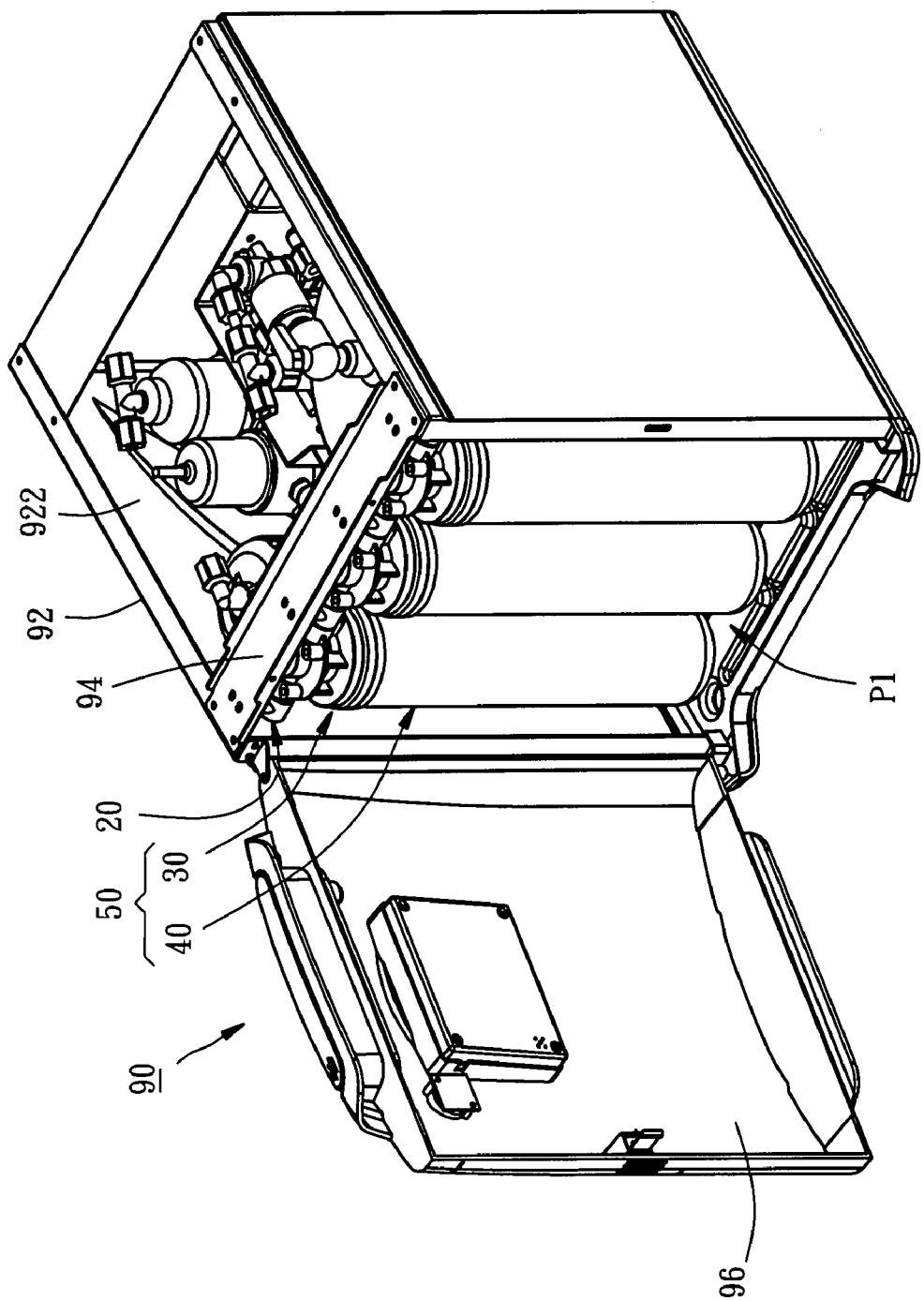
FIG. 1 is a perspective view of a preferred embodiment of the present invention, showing the housing is located at the first position.

As shown in FIG. 1 to FIG. 6, a water purification apparatus 90 in accordance with a preferred embodiment of the present invention comprises a main body 92, a lid 96, four holders 20, three top covers 30, and three housings 40.

The main body 92 has an accommodation chamber 922 inside and a plate 94 on a top side thereof.

The lid 96 is pivotally mounted on a front side of the main body 92 and closable on the front side of the main body 92 to close the accommodation chamber 922 of the main body 92.

Figure 2:
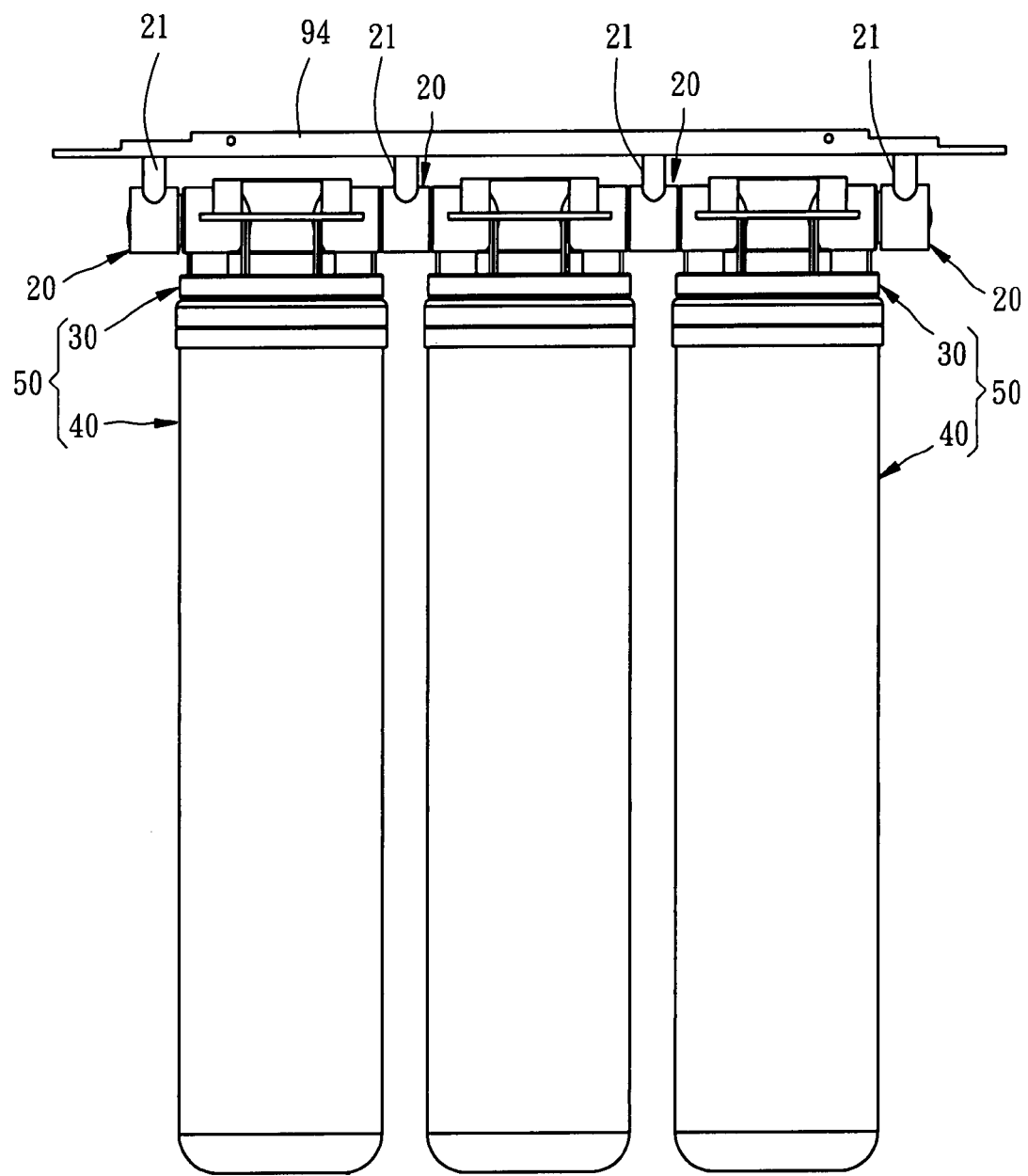
FIG. 2 is a front view of a part of the preferred embodiment of the present invention.
Figure 3:
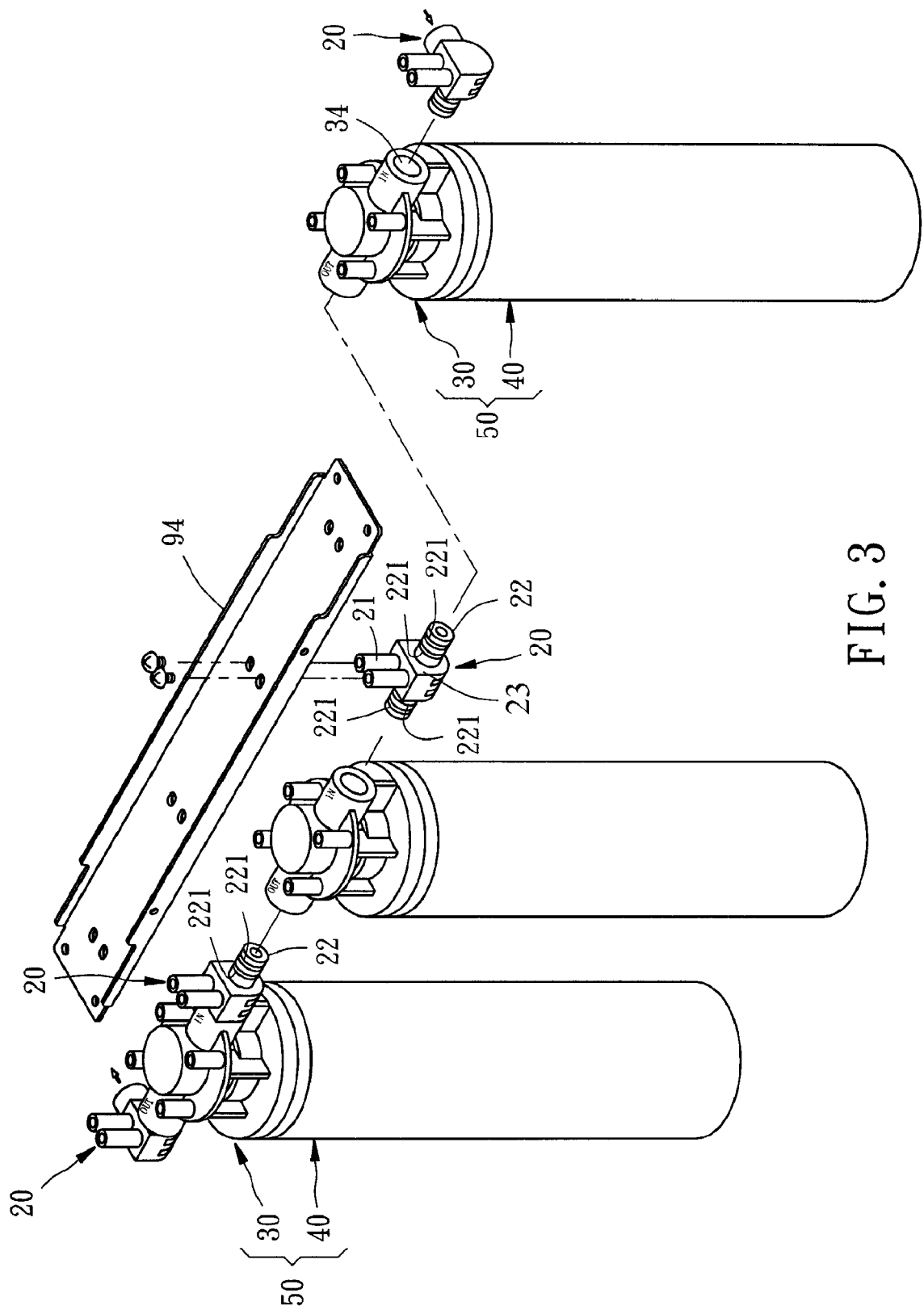
FIG. 3 is an exploded view of a part of the preferred embodiment of the present invention.
Figure 4:
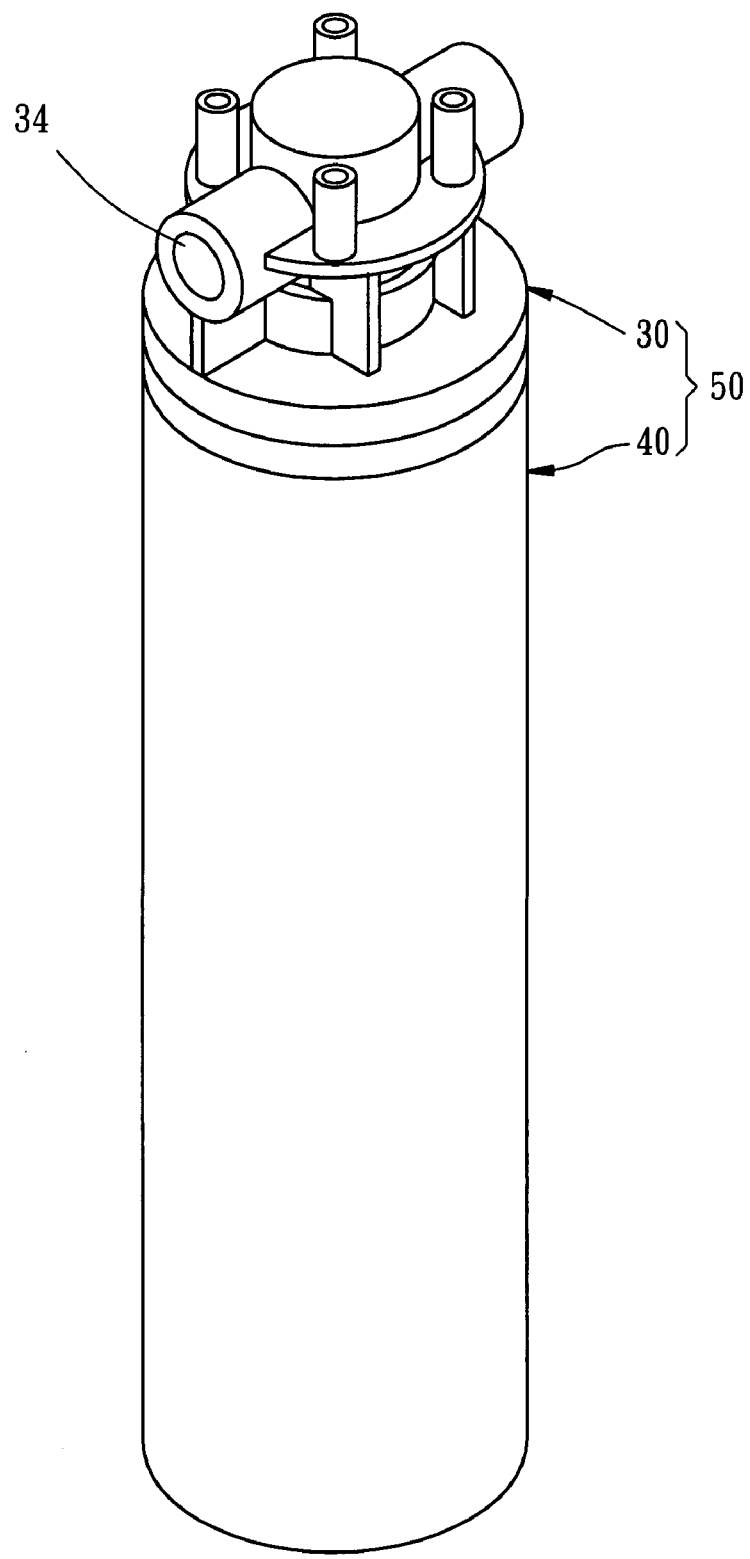
FIG. 4 is a perspective view of the filter assembly of the preferred embodiment of the present invention.

Referring to FIG. 2 and FIG. 3, the holders 20 each have a connecting portion 23, two dangling portions 21 on a top side of the connecting portion 23, and a pair of water-guiding portions 22 extending from two sides of the connecting portion 23. The dangling portions 21 are fixed on the plate 94 of the main body 92 such that the top side of the connecting portion 23 of the holder 20 defines with a bottom side of the plate 94 of the main body 92 a distance. The holders 20 further has a plurality of O-rings 221 fixed on the water-guiding portions 22.

Figure 5:
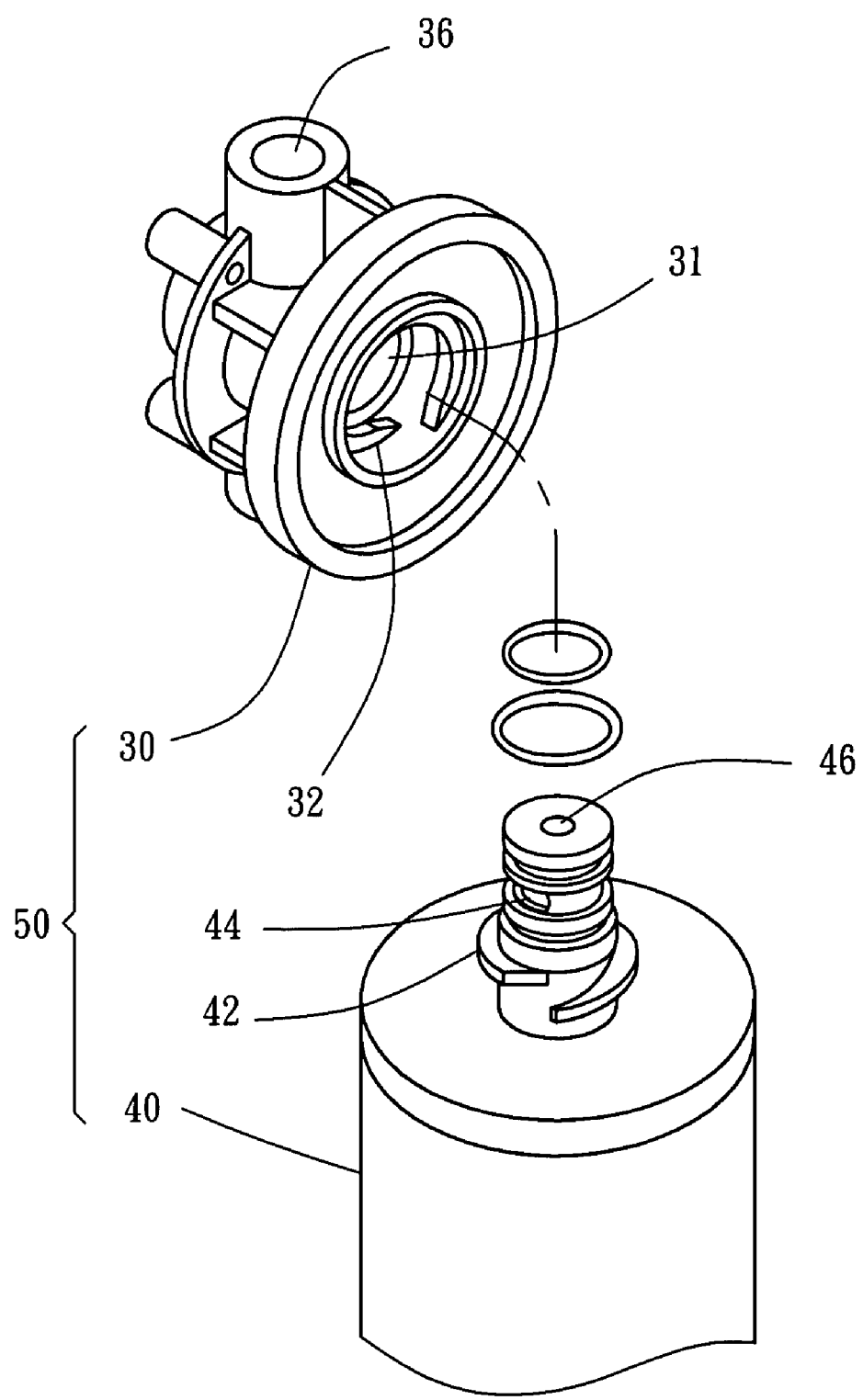
FIG. 5 is a perspective view of a part of the preferred embodiment of the present invention, showing the top cover is disengaged with the housing.
Figure 6:
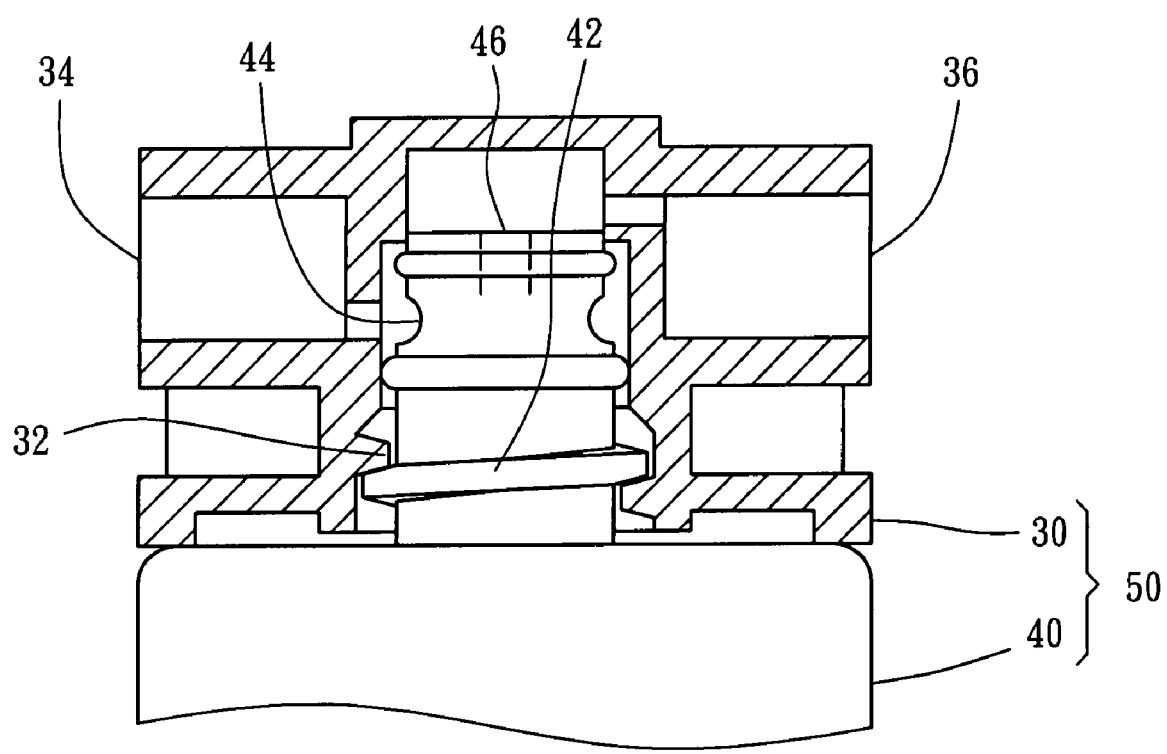
FIG. 6 is a sectional view of a part of the preferred embodiment of the present invention, showing the top cover is engaged with the housing.

Referring to FIG. 3 and FIG. 5, the top cover 30 have a cavity 31 on a bottom side thereof, a retaining portion 32, which is a spiral protrusion formed on a periphery of the cavity 31, an inlet 34 on a top section thereof, and an outlet 36 on the opposite side of the inlet 34. One distal end of the water-guiding portion 22 of the holder 20 can be inserted into the inlet 34 or the outlet 36 of the top cover 30 and the O-rings 221 of the holder 20 fixed on the water-guiding portion 22 can be in contact with an inner periphery of the inlet 34 or the outlet 36 of the top cover 30 such that the top cover 30 is pivotable about the axis of the water-guiding portions 22 of the holder 20 and water is stopped by the O-rings 221 of the holder 20.

The housing 40 has a receiving chamber (not shown) inside for accommodation of a filter, a jamming portion 42, which is a spiral protrusion formed on a top side thereof, a first water filler hole 44 in communication with the inlet 34 of the top cover 30 and a second filler hole 46 in communication with the outlet 36 of the top cover 30. When the spiral protrusion of the housing 40 is inserted in the cavity 31 of the top cover 30 to attach to the spiral protrusion of the top cover 30 and rotated 90 degrees, the housing 40 and the top cover 30 are engaged with each other to make up a filter assembly 50. Further, because of the existence of the distance between the connecting portion 23 of the holder 20 and the plate 94 of the main body 92 of the water purification apparatus 90, the top cover 30 and the housing 40 can be pivotable relative to the main body 92 between a first position P1 where the housing 40 is located in the accommodation chamber 922 of the main body 92, as shown in FIG. 1, and a second position P2 where the housing 40 is rotated to the outside of the main body 92, as shown in FIG. 7.

Figure 7:
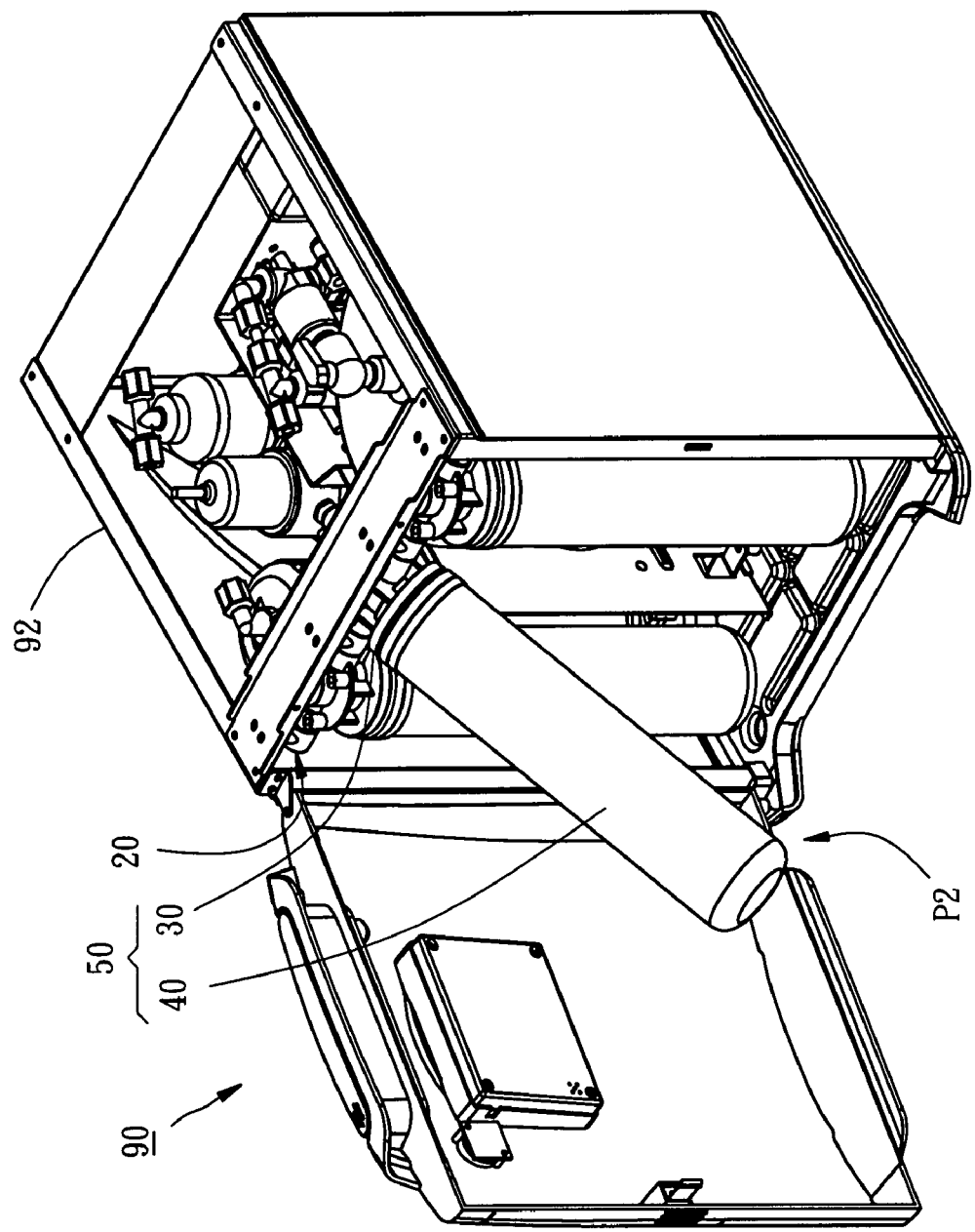
FIG. 7 is a perspective view of the preferred embodiment of the present invention, showing the housing is located at the second position.
Figure 8:
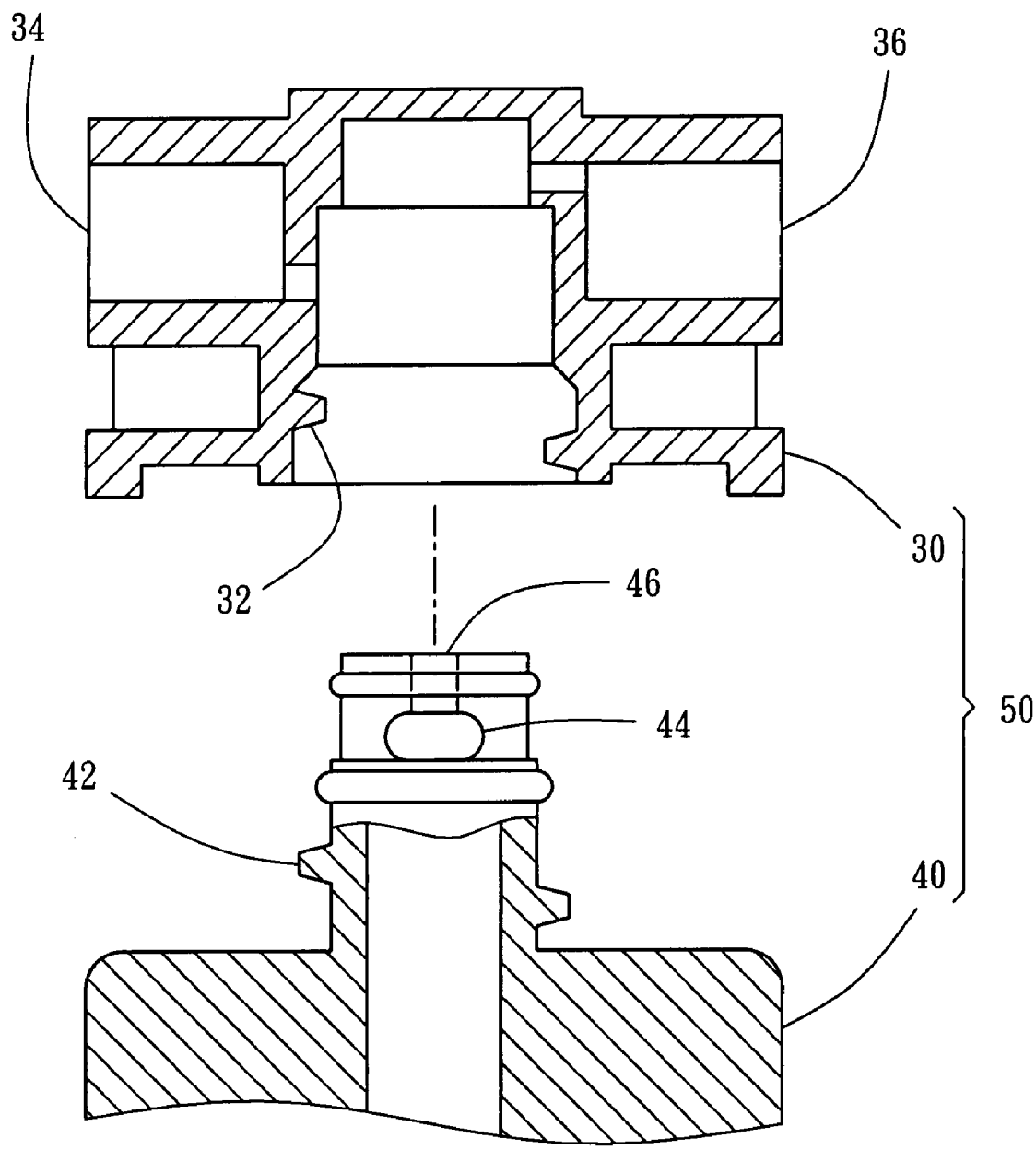
FIG. 8 is a sectional view of a part of the preferred embodiment of the present invention, showing the top cover is disengaged with the housing.

When a user wants to exchange the filter inside the housing 40, he/she needs to pivot the filter assembly 50 about the axis of the water-guiding portions 22 of the holder 20 so as to locate at the second position P2, as shown in FIG. 7, and then rotates the housing 40 90 degrees clockwise such that the housing 40 is separated from the top cover 30, as shown in FIG. 8. Thus, the user can take the old filter out of the housing 40 and place a new filter inside. Thereafter, the user can hold the housing 40 to enable the jamming portion 42 to be inserted into the cavity 31 of the top cover 30 and subsequently rotates the housing 40 90 degrees counterclockwise such that the housing 40 is engaged with the top cover 30, as FIG. 4 and FIG. 6, and pushes the filter assembly 50 toward the main body 92 to locate at the first position P1, as shown in FIG. 1, thereby accomplishing the filter exchange work.

By means of the aforesaid design, the top cover and the housing has a simple coupling procedure for enabling the user to exchange the filter conveniently. Furthermore, because of the distance between the connecting portion of the holder and the plate of the main body, the filter assembly can be rotated to the outside of the main body of the water purification apparatus during the filter exchange work in spite of the restriction of the interior space of the main body.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A water purification apparatus comprising:
   a main body having an accommodation chamber inside and a plate on a top side thereof;
   a lid pivotally mounted on the main body and closable on the main body;
   at least two holders each comprising a connecting portion and a pair of water-guiding portions extending from two sides of the connecting portion, said holders being mounted under the plate of the main body and defining a distance between a top side of the connecting portion and a bottom side of the plate of the main body; and
   a filter assembly comprising
      a top cover having a retaining portion, an inlet and an outlet opposite to the inlet; and
      a housing having a jamming portion detachably engageable with the retaining portion of the top cover for detachably coupling the top cover with the housing, a first water filler hole in communication with the inlet of the top cover and a second water filler hole in communication with the outlet of the top cover,
   wherein
   the water-guiding portions of the holders are aligned to form an axis; and
   one water-guiding portion of one of the holders is inserted into the inlet of the top cover of the filter assembly and one water-guiding portion of another of the holders is inserted into the outlet of the top cover of the filter assembly, such that the filter assembly is rotatable about the axis formed by the water-guiding portions for filter replacement.

2. The water purification apparatus as claimed in claim 1, wherein the retaining portion of the top cover is a spiral protrusion and the jamming portion of the housing is a spiral protrusion.

3. The water purification apparatus as claimed in claim 1, wherein the holder further includes a plurality of O-rings, which are fixed on the water-guiding portions and in contact with an inner periphery of the inlet and with an inner periphery of the outlet of the top cover.

* * * * *